I. T. CARTER.
SKINNING KNIFE.
APPLICATION FILED MAY 13, 1912.
1,065,863. Patented June 24, 1913.
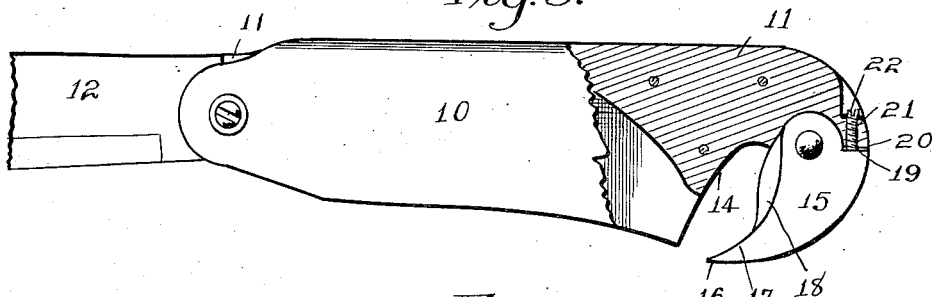
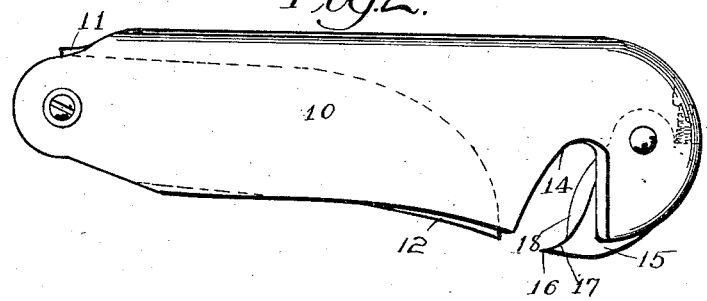
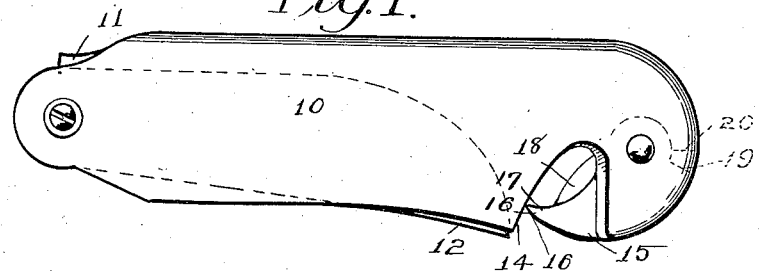
Witnesses
A. G. Hague
W. A. Loftus
Inventor
Isaac T. Carter
by Dwight Baldwin

UNITED STATES PATENT OFFICE.

ISAAC T. CARTER, OF EMMETSBURG, IOWA.

SKINNING-KNIFE.

1,065,863.  Specification of Letters Patent.  Patented June 24, 1913.

Application filed May 13, 1912. Serial No. 697,071.

*To all whom it may concern:*

Be it known that I, ISAAC T. CARTER, a citizen of the United States, residing at Emmetsburg, in the county of Palo Alto and State of Iowa, have invented a certain new and useful Skinning-Knife, of which the following is a specification.

The object of my invention is to provide a skinning knife of simple, durable and inexpensive construction, provided with a special blade whereby the hide of an animal may be cut from the inner or under side and provided with a pointed blunt hook for pulling the hide from the body and for preceding the blade thereby holding the blade in position for cutting the skin.

A further object is to provide such a blade which is adjustable and which is attached to an ordinary knife.

My invention consists in certain details, in the construction, arrangement and combination of the various parts of my device, whereby the objects contemplated are attained, as hereinafter more fully set forth, pointed out in my claims, and illustrated in the accompanying drawings, in which—

Figure 1 shows a plan view of a skinning knife embodying my invention with the adjustable skinning blade in one position of its movement. Fig. 2 shows a plan view of the same with the adjustable skinning blade in another position. Fig. 3 is a similar view, partly in section, showing the large blade of the knife open and showing the manner in which the skinning blade is adjusted.

In the accompanying drawings, I have used the reference numeral 10 to indicate the handle of a knife which may be of any suitable material. In the back of the handle is mounted an ordinary steel spring 11. A large blade 12 is secured in one end of the knife in the ordinary manner, preferably by a spring device whereby the knife may be locked in its open position. In the front of the handle 10, near the end thereof, opposite the end where the blade 12 is secured, is a notch 14, extending through the handle from side to side, and extending from the front, approximately half way to the back of the handle. The form of the notch 14 may be varied to a considerable extent. Pivoted between the sides of the handle 10 is a hook member 15, designed in some of the positions of its movement to extend across the notch 14. In one position of the hook member 15, the point 16 thereof is received within the notch 14 as shown in Fig. 1, so that the point 16 will not tear the clothes or pocket of anyone carrying the knife. The inner part 17 of the hook member adjacent to the point thereof, is blunt. Mounted on the inner side of the hook member 15 is a sharp blade 18 which extends from the blunt portion 17 of the hook member 15 to a point near the pivotal point of such hook. Formed on the outer side of the hook member 15 is a shoulder 19, shown in dotted lines in Fig. 1. Formed on the steel spring 11 is a shoulder 20 shown by the dotted lines in Fig. 1, whereby the movement of the hook member 15, away from the notch 14, is limited. The shoulders 19 and 20 are so located that when the hook member 15 is at the outward limit of its movement, the point 16 thereof stands slightly outside the line of the front of the knife. Mounted in the spring 11 is a screw 21, one end of which is flat and is designed in various positions of its movement to extend through the shoulder 20 and to adjustably limit the outward movement of the hook member 15. In one end of the screw 21 is a notch 22 to receive the end of a small screw driver.

In practical operation, a small slit may be cut in a skin and the point 16 of the hook member 15 inserted under the skin. The skinning blade may then be drawn along as desired. The blunt portion 17 of the hook member 15 will hold said hook member in position under the skin and the blade 18 will cut the skin from the under side. The position of the hook member 15 may be adjusted by means of the screw 21.

There are a number of advantages inhering in my improved skinning knife. The hook member 15 may be mounted on an ordinary knife at a comparatively small cost of manufacture and when a knife is carried in the pocket, the hook member is entirely out of the way. When in use, the hook member may be moved outwardly and adjusted to the desired position. With the ordinary method of removing and cutting the skin, the skin is pulled from the carcass by hand, the knife blade is inserted under the skin and is drawn outwardly. The blade tends constantly to cut entirely through the skin and it must then be again inserted under the skin. With my improved skinning knife, the blunt portion 17 prevents the hook member from cutting through the skin and a slit may be made as long as desired. The cutting is done entirely from the under side of the skin and the blade 18 is subject to very little contact with sand or the like on the outside of the hide.

I claim as my invention:

1. In a device of the class described, the combination of a handle having a comparatively deep notch in one end thereof, with a hooked blade pivoted in the handle to swing across the notch, said blade having a blunt portion adjacent to the point thereof and having a comparatively long cutting edge between the said blunt portion and the pivotal point of the blade, and means for limiting the opening movement of said blade to a position where the point thereof is slightly above the handle outside the notch.

2. In a device of the class described, the combination of a handle having a comparatively deep notch in one end thereof, one side of which is substantially vertical, and the other side of which is inclined, with a hooked blade pivoted in the handle to swing across the notch, said blade having a blunt portion adjacent to the point thereof and having a comparatively long cutting edge between the said blunt portion and the pivotal point of the blade, and means for limiting the opening movement of said blade to a position where the point thereof is slightly above the handle outside the notch, so that the point and the blunt portions may travel close under a hide which is held toward said point and blunt portion by the portion of the handle adjacent to the notch on the side opposite the end of the handle in which said blade is pivoted.

3. In a device of the class described, a handle having a notch in one side thereof, a hook member pivoted in said handle, and designed in various positions of its movement to swing across said notch and to swing to a point outside the notch, a sharp blade in the inner side of said hook member, and adjustable means for limiting the outward movement of said hook member.

4. In a device of the class described, a handle having a notch in one side thereof, a hook member pivoted in said handle, and designed in various positions of its movement to swing across said notch and to swing to a point outside the notch, a sharp blade in the inner side of said hook member, adjustable means for limiting the outward movement of said hook member, said means comprising a shoulder formed on said hook member, a shoulder formed on said handle and a screw in said handle extending through the shoulder thereon, designed to engage the shoulder on said hook member.

5. In a device of the class described, the combination of a handle having a comparatively deep notch in one end thereof, with a hooked blade pivoted in the handle to swing across the notch, said blade having a blunt portion adjacent to the point and having a comparatively long cutting edge between the said blunt portion and the pivotal point of the blade, and means for limiting the opening movement of said blade to a position where the point thereof is slightly above the handle outside the notch, so that the cutting edge of said blade is within said notch.

6. In a device of the class described, the combination of a handle having a comparatively deep notch therein with a hooked blade detachably pivoted in the handle to swing across the notch, and means for limiting the opening movement of said blade.

7. In a device of the class described, the combination of a handle having a comparatively deep notch therein with a hooked blade detachably pivoted in said handle, to swing across the notch, said blade having a blunt portion adjacent to the point thereof and a comparatively long cutting edge between said blunt portion and the pivotal point of the blade and means for limiting the opening movement of said blade to a position where the point thereof stands slightly above the handle outside the notch.

Des Moines, Iowa, May 1, 1912.

ISAAC T. CARTER.

Witnesses:
  LEWIS STUEHMER,
  E. M. CARNEY.

---

Copies of this patent may be obtained for five cents each, by addressing the "Commissioner of Patents, Washington, D. C."